United States Patent [19]

Uehira

[11] Patent Number: 5,058,505
[45] Date of Patent: Oct. 22, 1991

[54] CARRYING APPARATUS DRIVEN BY LINEAR MOTOR WITH WEIGHT CALCULATION TO CONTROL DRIVING FORCE OF MOTOR

[75] Inventor: Makoto Uehira, Takatsuki, Japan

[73] Assignee: Tsubakimoto Chain Co., Osaka, Japan

[21] Appl. No.: 470,828

[22] Filed: Jan. 26, 1990

[30] Foreign Application Priority Data

Feb. 2, 1989 [JP] Japan ................................. 1-25442

[51] Int. Cl.[5] .......................................... B06L 13/06
[52] U.S. Cl. .................................... 104/284; 104/292; 104/300
[58] Field of Search ............... 104/281, 284, 290, 291, 104/292, 293, 300; 246/187 B, 193

[56] References Cited

U.S. PATENT DOCUMENTS

| | | | |
|---|---|---|---|
| 3,641,939 | 2/1972 | Remy | 104/293 |
| 3,820,470 | 6/1974 | Karch et al. | 104/293 |
| 4,055,123 | 10/1977 | Heidelberg | 104/293 X |
| 4,140,063 | 2/1979 | Nakamura | 104/284 |
| 4,284,010 | 8/1981 | Marshall | 104/293 X |
| 4,787,317 | 11/1988 | Bohn et al. | 104/281 |
| 4,793,263 | 12/1988 | Basic et al. | 104/282 |
| 4,825,773 | 5/1989 | Morishita et al. | 104/284 |

FOREIGN PATENT DOCUMENTS 62-281703 12/1987 Japan .

Primary Examiner—Matthew C. Graham
Assistant Examiner—S. Joseph Morano
Attorney, Agent, or Firm—Darby & Darby

[57] ABSTRACT

A carrying apparatus driven by a linear motor which is capable of keeping response at the time of acceleration and deceleration almost constant in spite of the change of the weight of the carrying vehicle. At the carrying vehicle side, the magnitude of a gap between a track and the carrying vehicle, which is in the state of non-contact with the track due to an electro-magnet, and the electric current flowing through the electro-magnet is detected. The weight information related to the weight of the carrying vehicle is calculated on the basis of above detected results. The calculated weight information of the carrying vehicle is transmitted to a running control unit at the ground side. The driving force of the linear motor is adjusted on the basis of the transmitted weight information.

5 Claims, 6 Drawing Sheets

CARRYING APPARATUS DRIVEN BY LINEAR MOTOR WITH WEIGHT CALCULATION TO CONTROL DRIVING FORCE OF MOTOR

BACKGROUND OF THE INVENTION

1. Field of the Invention

The invention relates to a ground primary type carrying apparatus driven by a linear motor, especially for speed control during acceleration and deceleration.

2. Description of Related Art

A carrying apparatus driven by a linear motor as a driving source, which makes a carrying vehicle move along a predetermined track, is generally driven because of thrust. This thrust is provided by an interaction between an electric current and a magnetic field, which acts upon the place between a secondary conductive plate and stators. The plate is fixed to the carrying vehicle and supports the carrying vehicle by a magnetic action force. An electro-magnet, which is in a non-contact state with a predetermined gap between itself and the track, provides the magnetic action force. The stators are provided at predetermined intervals at positions opposite to the secondary conductive plate along the track of the carrying vehicle.

In such a conventional carrying apparatus driven by a linear motor, however, the weight of the carrying vehicle changes depending on its load. The change of the gap due to the change of the weight of the carrying vehicle is stably controlled by providing, at the carrying vehicle, an electric current detecting unit. This unit is for detecting an electric current flowing through a coil of the electro-magnet. A gap sensor is also provided for detecting the gap. Thus, the electric current flowing through the coil is controlled so as to have the constant length of the gap being detected by the gap sensor.

In the case where the carrying vehicle is heavy, however, response is late for acceleration and deceleration. A long distance and time is required for predetermined acceleration and deceleration. When acceleration is insufficient, there is a problem in that the carrying vehicle's hang-up occurs because the carrying vehicle energized by a stator can't reach the next stator to energize the carrying vehicle because of running resistance, such as air resistance which is given to the carrying vehicle. When deceleration is insufficient, there is another problem in that the carrying vehicle goes too far away from the predetermined stop position.

In the case where the carrying vehicle is lighter, response at its acceleration and deceleration is so speedy that it leads to the sharp speed change at its acceleration and deceleration, resulting in a problem that shock is given to the load. There is also a problem in that the speed is too reduced at its deceleration, causing the carrying vehicle's hang-up between stators in the same way as for acceleration as previously described.

As may be clear from the above description, in the conventional carrying apparatus driven by a linear motor, it has been difficult to control the running motion of the carrying apparatus satisfactorily because response at acceleration and deceleration of the carrying vehicle changes depending on its load.

In order to solve these problems, there is a method to calculate acceleration from the speed change of the carrying vehicle and to control the acceleration to be constant, by which stabilized response at acceleration and deceleration of the carrying vehicle can be obtained.

In addition, in Japanese Patent Application Laid-Open No. 62-281703 (1987), a carrying apparatus driven by a linear motor is proposed. This apparatus makes response at its acceleration and deceleration constant by providing at its track side a gap sensor for detecting the gap length between the carrying vehicle and the track in order to measure the gap length which is converted to the weight of the carrying vehicle. Further, the driving force is adjusted so that the absolute value of the driving force of the linear motor which drives the carrying vehicle according to the increment of the weight thereof can be increased.

The aforementioned method for controlling acceleration to be constant requires a speed detector with high discrimination. Such a speed detector, however, receives an influence of noise easily and, in addition, the cost of equipment of it is expensive.

There is a problem that a control unit for carrying out compound control at high speed is required, which causes the apparatus to be expensive.

Furthermore, in the latter carrying apparatus driven by a linear motor which calculates the weight of the carrying vehicle on the basis of the gap length between the carrying vehicle and the track and which adjusts the driving force on the basis of aforesaid weight of the carrying vehicle, there is a problem that many more gap sensors must be provided at the track side thereof. This results in a problem that the cost of equipment of the apparatus becomes expensive.

SUMMARY OF THE INVENTION

The present invention provides a carrying apparatus driven by a linear motor wherein no gap sensor is required to be provided at the track side thereof and the cost thereof is inexpensive. The invention provides for the steps of detecting, at the side of the carrying vehicle, the gap length between the carrying vehicle and the track. The electric current of the coil of electro-magnet for supporting the carrying vehicle in the state of non-contact is detected by using the gap sensor and the current detecting unit, which are used for controlling the gap length. The invention includes calculating the weight of the carrying vehicle on the basis of the above detected result and sending the information on the weight as a weight information signal from a non-contact type communication unit, which is mounted on a conventional carrying apparatus. This is done to give instruction to be in non-contact or to remove that instruction. The running control of the carrying vehicle is carried out on the basis of the received result by the running control unit on the track side.

Another object of the invention is to provide a carrying apparatus driven by a linear motor whose response is constant at its acceleration and deceleration in spite of the weight of the carrying vehicle by controlling the drive of the carrying vehicle according to the weight thereof.

In order to attain these objects, a carrying apparatus driven by a linear motor of the invention comprises a carrying vehicle running along a track which is provided with means for detecting the gap length between aforesaid carrying vehicle and the track. There is means for detecting the electric current flowing through the coil of electro-magnet. There is means for transmitting these detected results as weight information signal and running motion controlling means for controlling the running of the carrying vehicle which is provided with means for receiving the weight information signal and with means for adjusting the driving force of the linear motor on the basis of the received result. When the carrying vehicle runs, the gap length and the electric current of the coil are detected. Thus, the weight of the carrying vehicle is detected according to the detected gap length and the electric current flowing through the coil of electro-magnet for creating the gap against the track. The weight information is sent to the control unit for controlling the running motion, which is installed at a carrying path. The control unit, which has received the information, adjusts the driving force so that the driving force of the linear motor becomes larger as the weight of the received result becomes heavier. In this manner, the response of acceleration and deceleration is constant in spite of the weight change of the carrying vehicle and takes place without providing gap detecting means on the track.

The above and further objects and features of the invention will more fully be apparent from the following detailed description with accompanying drawings.

DESCRIPTION OF THE PREFERRED EMBODIMENTS

Figure 1:
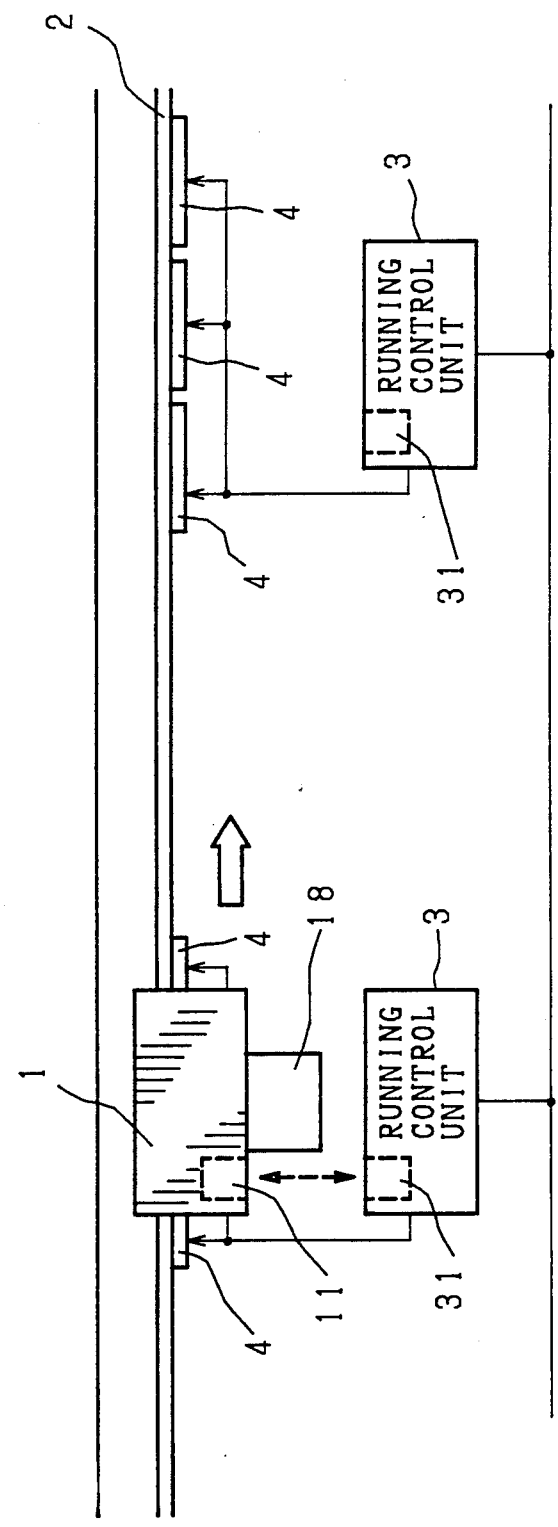
FIG. 1 is a schematic side view showing a carrying apparatus of the invention being driven by a linear motor.
Figure 2:
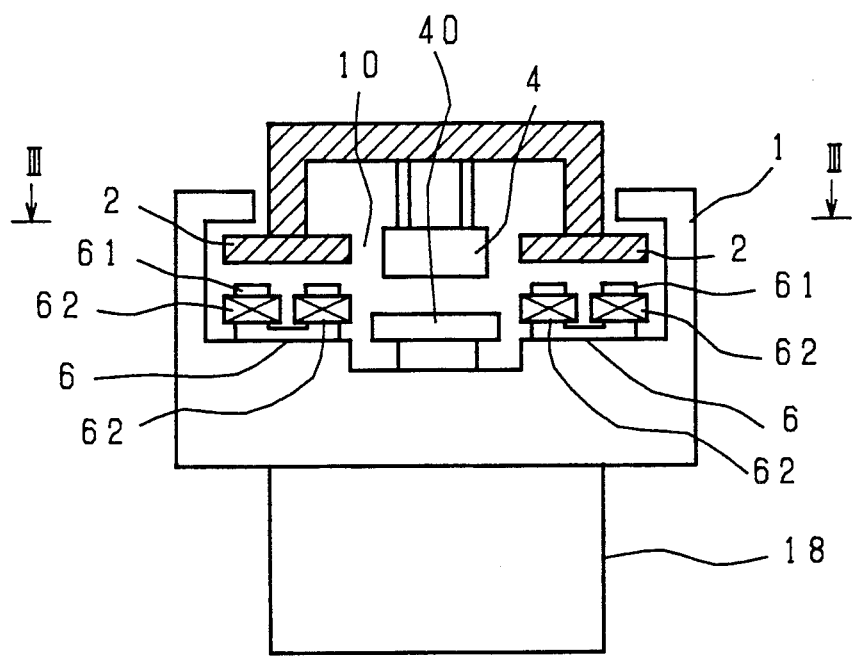
FIG. 2 is a schematic front view of FIG. 1.
Figure 3:
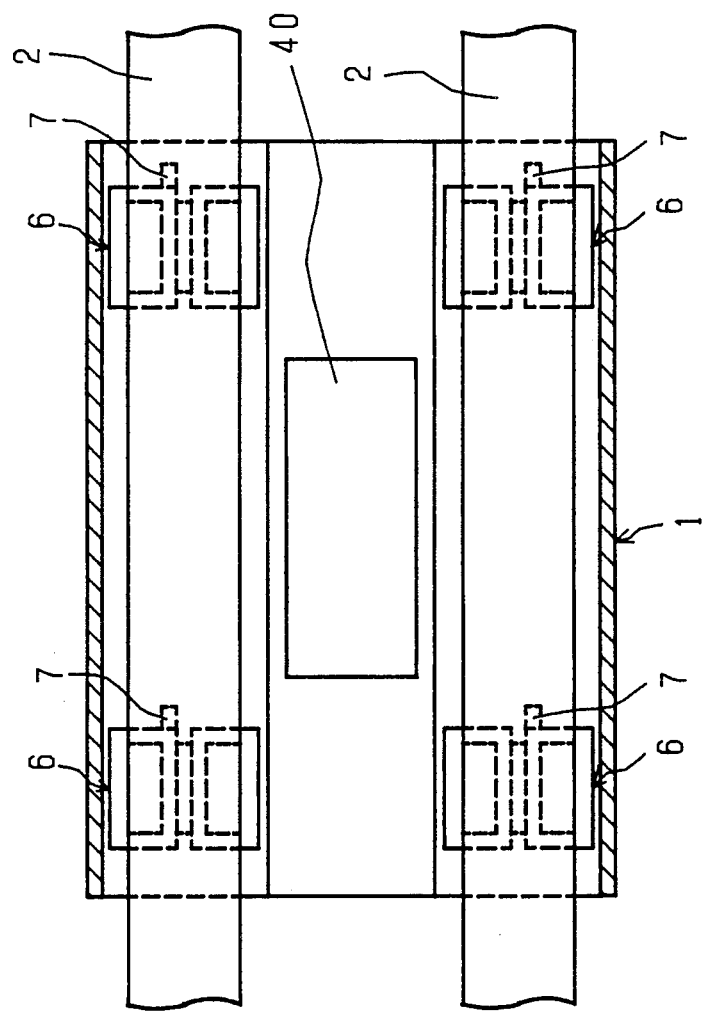
FIG. 3 is a schematic plan view showing the positional relationship between the track and the electro-magnets in the carrying vehicle.
Figure 4:
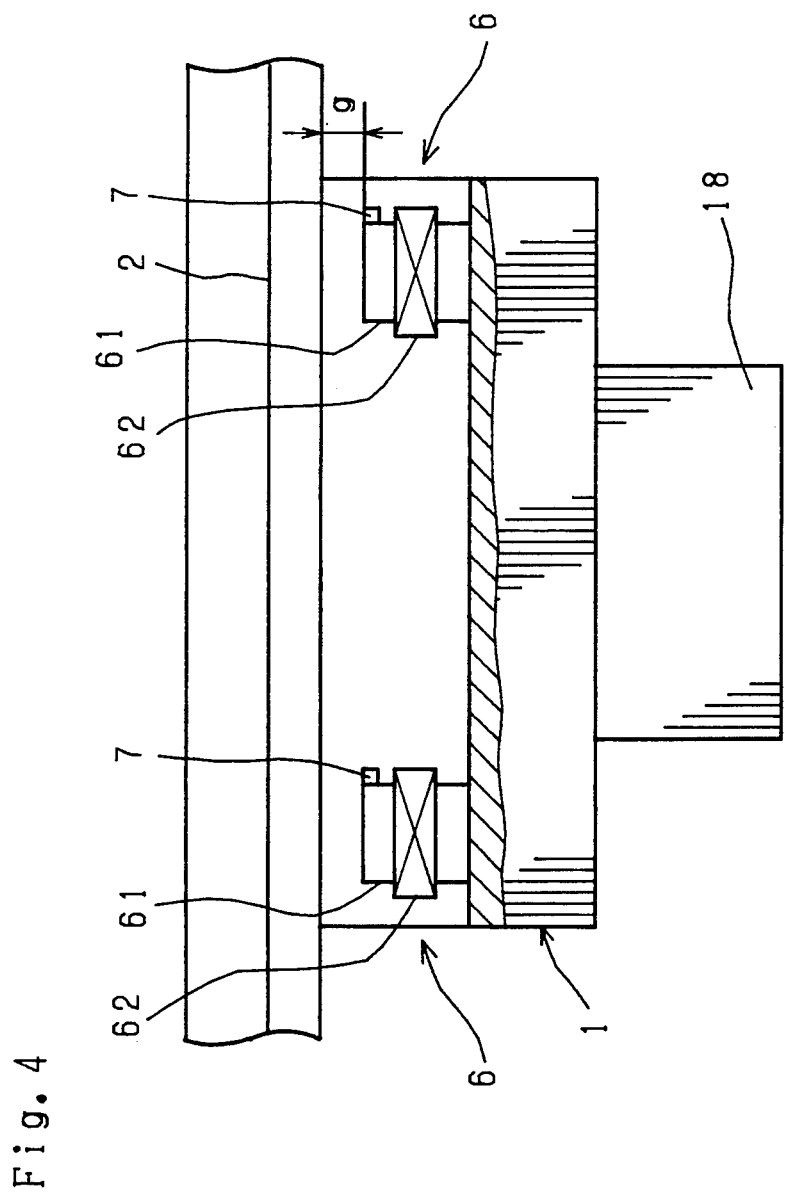
FIG. 4 is a schematic side view of FIG. 3.

FIG. 1 is a schematic side view showing the construction of a carrying apparatus of the invention driven by a linear motor. FIG. 2 is a schematic front view of the carrying apparatus shown in FIG. 1. FIG. 3 is a schematic plan view showing the positional relationship between the track and the electro-magnet in the carrying vehicle. FIG. 4 is a schematic side view of the carrying vehicle shown in FIG. 3.

In the figures, a carrying vehicle 1 is running along two tracks 2, 2 being provided along its running path and is in the state of being in non-contact with the tracks. The carrying vehicle 1 has a lower part provided with a container 18 for housing the things to be carried and has an upper part. A groove 10 extends from the front face to the rear face of the carrying vehicle 1 for passing the tracks 2, 2. At the bottom central portion of the groove 10, a conductive plate 40 as the secondary of the linear motor is provided. In addition, on both sides of the front end portion and the rear end portion of the groove 10, four electro-magnets 6, 6, each being formed of U-shaped iron core 61 wound by coil 62, 62 at the both edges thereof and carrying out non-contact supporting against the tracks 2, 2, are arranged to oppose the lower surface or the tracks 2, 2, through which passes, the groove 10 respectively.

The upper surface of the carrying vehicle 1 floats up from the tracks 2, 2 by an appropriate length by the magnetic action force of the electro-magnets 6, 6, and as a whole, the carrying vehicle 1 looks to be hung from the tracks 2, 2 in the non-contact state.

Figure 5:
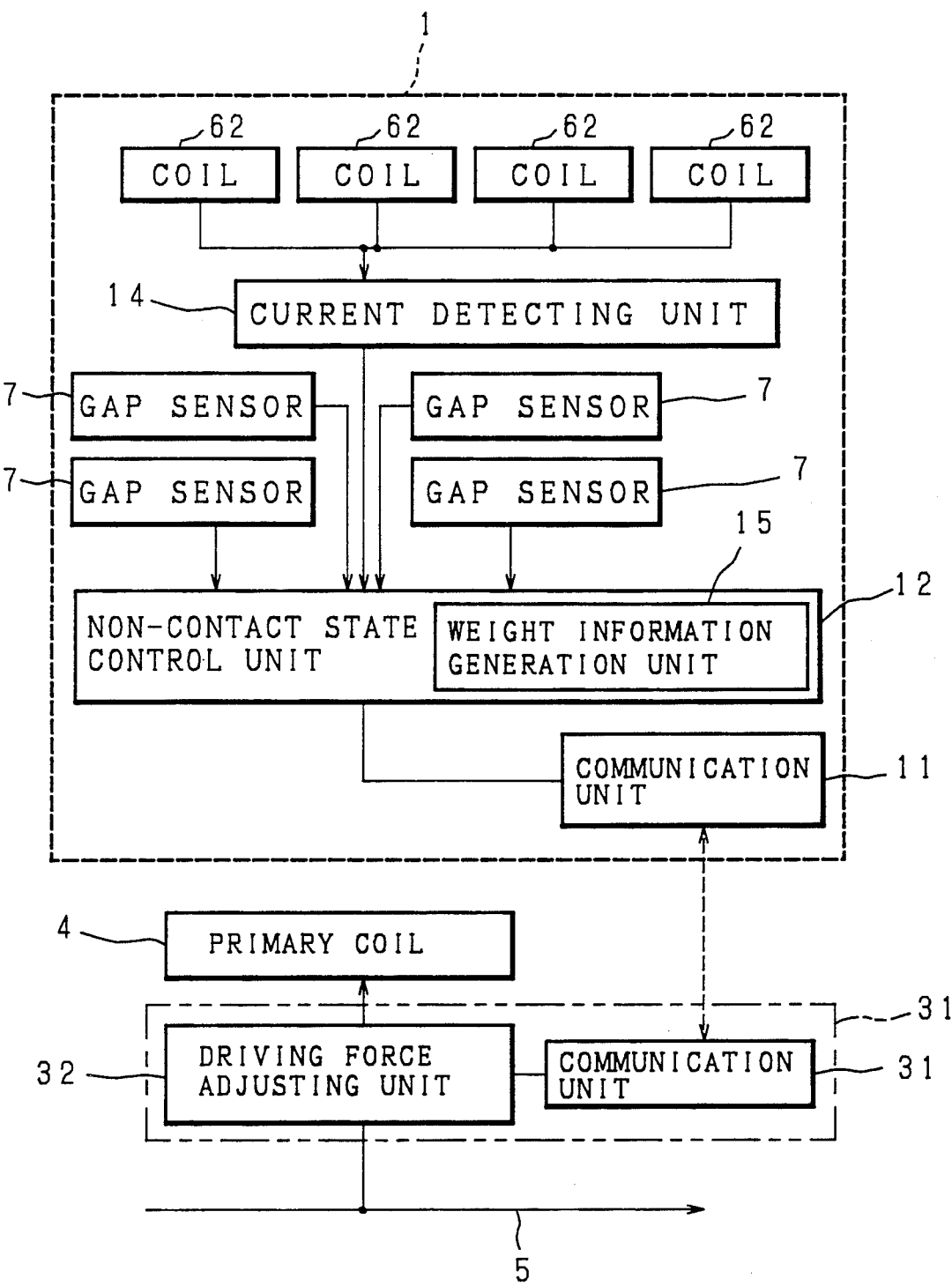
FIG. 5 is a block diagram of the control system.

In addition, as shown in FIG. 3 and FIG. 4, at the side surfaces of the electro-magnets 6, 6, four gap sensors are provided using, for example, an ultrasonic sensor, for detecting the gap length g between the respective lower surface of the tracks 2, 2 and the upper surface of the electro-magnets 6, 6. As shown in FIG. 5, each coil 62 is connected with an electric current detecting unit 14 for detecting the electric current flowing therethrough. These detected results are outputted to a non-contact state control unit 12 for controlling the non-contact state of the carrying vehicle relative to the tracks 2, 2.

As shown in FIG. 1, primary coils 4, 4 of the linear motor for giving the carrying vehicle 1 the driving force for running motion are arranged at an appropriate interval from the one to the next. The primary coils 4, 4 are connected with running control units 3 for being installed under the carrying vehicle 1 in order to control the running state thereof respectively. The primary coils 4, 4 are adapted to be excited by the running control units 3. A plurality of primary coils 4, 4 and the running control units 3 are provided in the path of the tracks 2, 2 at appropriate intervals from the one to the other. The running control units 3 are connected with each other so that the respective information of each of them can be transferred in the provided order of the path.

In addition, at the carrying vehicle 1, there is provided a communication unit 11 which sends the running state information thereof to the running control unit 3 and which receives such information as instruction to be non-contact or cancellation of the above instruction of the carrying vehicle 1. The information is transmitted from the running control unit 3 where there is provided a communication unit 31 which sends instructive information as previously described to the communication unit 11 and which receives such running state information as the weight of the carrying vehicle from the communication unit 11.

In the carrying vehicle driven by the linear motor constructed as above described, the carrying vehicle 1 reaches the non-contact state with respect to the tracks 2, 2 by the magnetic action force of the electro-magnets 6, 6, and the primary coils 4, 4 which are excited by the running control unit 3 to give the carrying vehicle 1 the energized force to be along the tracks 2, 2. Thereby, the carrying vehicle 1 runs along the tracks 2, 2.

FIG. 5 is a block diagram of the control system of the apparatus of the present invention.

The detected result of the gap length g being measured by the gap sensors 7, 7 and the detected result of the electric current flowing through the coil 62 being detected by a current detecting unit 14 are inputted to the non-contact state control unit 12 for carrying out non-contact state control of the carrying vehicle 1. In the non-contact state control unit 12, respective magnetic action force $f_n$ of the electro-magnets 6, 6 are calculated according to the gap length g and the current i flowing through the coil 62 of the electro-magnets 6, 6 on the basis of the following equation (1).

$$f_n = F_n(i_n, g_n) \tag{1}$$

here, $i_n$: electric current flowing through coil n
$g_n$: gap length measured by gap sensor n
$F_n$: function
n: each electro-magnet Each magnetic action force $f_n$ is adjusted in the non-contact state control unit 12 so that the gap length $g_n$ can be controlled to be a constant value by changing the electric current $i_n$. Such control has conventionally been carried out, but the present invention is devised by taking into consideration that the weight of the carrying vehicle 1 is equal to the sum of the magnetic action force $f_n$, thereby detecting the weight of the carrying vehicle. The non-contact state control unit 12 comprises a weight information generating unit 15 for generating the weight information of the carrying vehicle 1. The sum of the magnetic action force $f_n$ is calculated at the weight information generating unit 15 to be outputted to the communication unit 11 as the information of the weight of the whole carrying vehicle 1 including the weight of things to be carried which are housed in the container 18.

At the communication unit 11, the inputted information on the weight of the carrying vehicle 1 is sent as the weight information signal to the communication unit 31 of the running control unit 3. At the communication unit 31, the weight information signal being sent from the communication unit 11 is received to input the received result to a driving force adjusting unit 32 of the running control unit 3.

At the driving force adjusting unit 32 of the running control unit 3, exciting frequency is preset to be high so that the thrust of the primary coils 4, 4 for driving the carrying vehicle 1 may be increased as the weight of the carrying vehicle 1 increases. When the weight information is inputted, the primary coils 4, 4 are excited by the electric current of the preset frequency. Thereby, energized force to the carrying vehicle 1 becomes larger as the weight of the carrying vehicle 1 increases, leading the response at the acceleration and deceleration of the carrying vehicle to be constant without being affected by the weight of the carrying vehicle.

In addition, the running control unit 3 outputs the inputted weight information to the running control unit 3 through which the carrying vehicle 1 is to pass from now on. The running control unit 3 being on the running path of the carrying vehicle 1, in which the weight information is inputted, is capable of controlling the speed of the carrying vehicle 1 on the basis of aforesaid weight information, thereby realizing its stabilized running.

Figure 6:
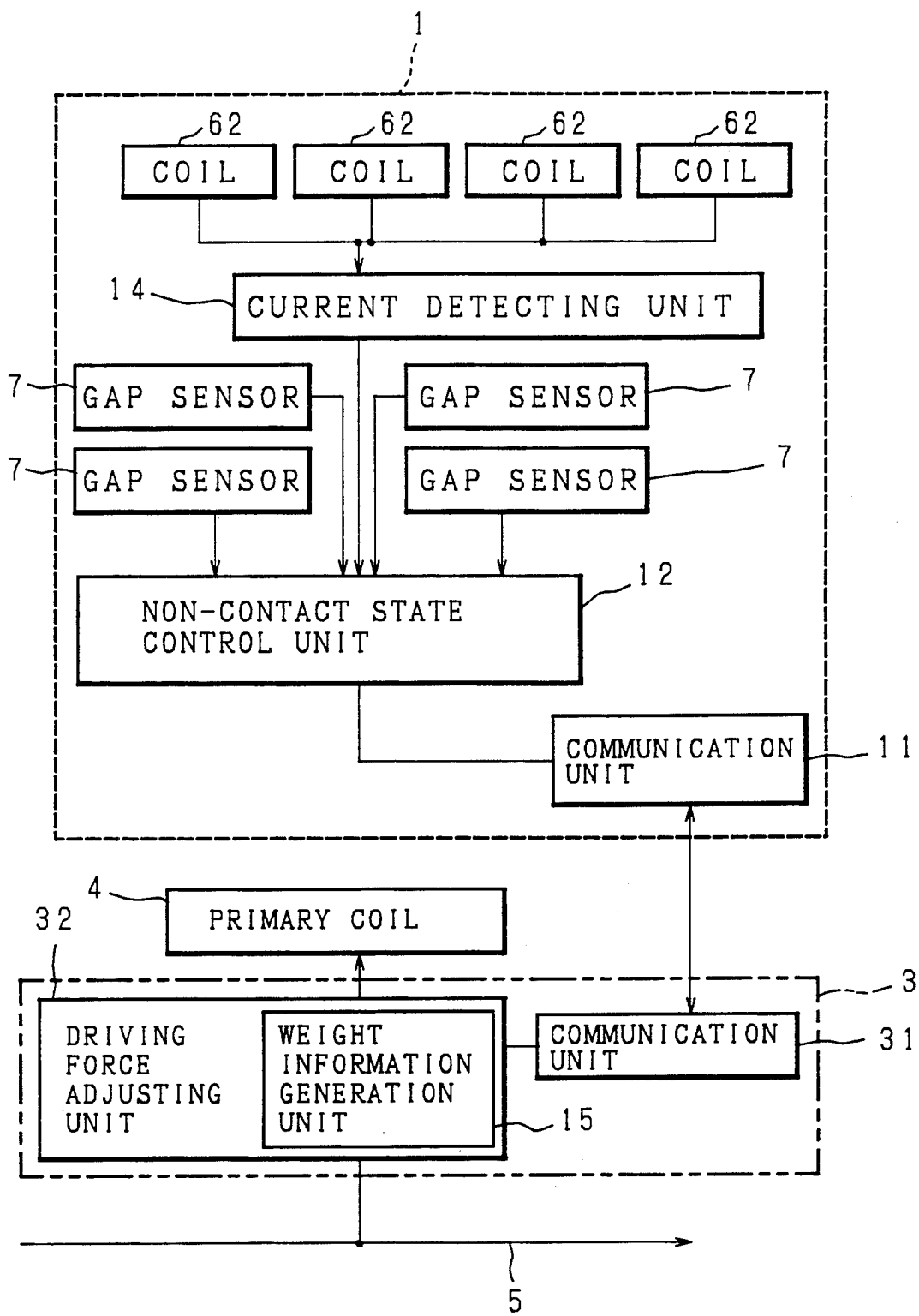
FIG. 6 is a block diagram of the control system of another embodiment.

Next, explanation is given on another embodiment of the invention. FIG. 6 is a block diagram of control system of the embodiment. In aforedescribed embodiment, the weight of the carrying vehicle 1 is calculated at the weight information generation unit 15 of the non-contact state control unit 12 at the side of the carrying vehicle 1. In this embodiment, however, respective detected results of the gap length and electric current of the coil 62 are outputted intact to the communication unit 11 by the non-contact state control unit 12, and sent by the communication unit 11 to be received in the communication unit 31. On the basis of the received result, the weight of the carrying vehicle 1 is calculated at the weight information generation unit 15 being provided at the driving force adjusting unit 32. Since the other construction of the another embodiment is the same as aforedescribed embodiment, explanation thereof is omitted here.

Furthermore, in aforedescribed two embodiments, there is described on the carrying vehicle 1 is for loading. It is not limited to this but is also possible to carry men and another heavy cargo.

In addition, a type of carrying apparatus whose carrying vehicle 1 is hung down in the state of being non-contact with the tracks 2, 2 has been described, however, the present invention is not limited to this, but is applicable to a type of carrying apparatus whose whole carrying vehicle floats in the position above the tracks 2, 2.

Moreover, it goes without saying that the adjustment of the driving force of a linear motor is not limited to the control of exciting frequency against stators, but the control of the voltage to be impressed thereto or the electric current flowing therethrough is also applicable.

As described in detail in the above, in the carrying apparatus driven by the linear motor related to the present invention, the gap length between the carrying vehicle and the tracks and the electric current of the coil of electro-magnets for non-contact supporting are detected at the side of the carrying vehicle. The weight of the carrying vehicle is then calculated on the basis of these detected results at the side of the carrying vehicle or the track. On the basis of this weight information, speed control of the carrying vehicle is carried out. It is not necessary to provide a detector at the side of the track, which results in the cost of equipment being inexpensive. The response at the time of accelerating and decelerating of the carrying vehicle is almost constant in spite of the change of the weight of the carrying vehicle. In this manner, stabilized running can be realized, and men and other heavy cargo can safely be carried.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A carrying apparatus driven by a linear motor comprising:
    a carrying vehicle which runs along a track by a driving force from the linear motor and has an electromagnet for making a gap between the track and the electromagnet, gap detecting means for detecting the magnitude of said gap, electric current detecting means for detecting an electric current flowing through a coil of said electromagnet, signal outputting means for outputting signals related to the detected magnitude of the gap and electric current and to weight information of the vehicle, in which said weight information is based on the detected magnitude of said gap and electric current, and transmitting means for transmitting the outputted signals; and
    running control means which is provided with receiving means for receiving the transmitted signals by said transmitting means and driving force adjusting means for adjusting the driving force of said linear motor on the basis of the received signals.

2. A carrying apparatus driven by a linear motor as set forth in claim 1, wherein said signal outputting means also calculates a magnetic action force of said electro-magnet on the basis of the detected magnitude of the gap and electric current, and outputs the weight information indicating the weight of said carrying vehicle on the basis of the calculated magnetic action force, and said transmitting means transmitting said weight information to said receiving means.

3. A carrying apparatus driven by a linear motor as set forth in claim 1, wherein said driving force adjusting means calculates a magnetic action force of said electromagnet on the basis of signals related to the magnitude of the gap and the electric current received by said receiving means and generates the weight information indicating the weight of said carrying vehicle on the basis of the calculated magnetic action force, and adjusts the driving force of said linear motor on the basis of the generated weight information.

4. A carrying apparatus driven by a linear motor as set forth in claim 2, wherein said driving force adjusting means increases exciting frequency to be given to a stator of said linear motor according to an increment of the weight of said carrying vehicle.

5. A carrying apparatus driven by a linear motor as set forth in claim 3, wherein said driving force adjusting means increases exciting frequency to be given to a stator of said linear motor according to an increment of the weight of said carrying vehicle.

* * * * *